United States Patent [19]

Nakano et al.

[11] Patent Number: 5,111,516
[45] Date of Patent: May 5, 1992

[54] APPARATUS FOR VISUAL RECOGNITION

[75] Inventors: Masaru Nakano, Nagoya; Kazutoshi Sukigara, Aichi, both of Japan

[73] Assignee: Kabushiki Kaisha Toyota Chuo Kenkyusho, Aichi, Japan

[21] Appl. No.: 507,406

[22] Filed: Apr. 11, 1990

[30] Foreign Application Priority Data

Apr. 11, 1989 [JP] Japan .................................. 1-91077

[51] Int. Cl.$^5$ .............................................. G06K 9/00
[52] U.S. Cl. ........................................ 382/14; 382/25
[58] Field of Search ...................... 382/14, 15, 25, 27, 382/30, 34

[56] References Cited

U.S. PATENT DOCUMENTS

| | | | |
|---|---|---|---|
| 4,712,248 | 12/1987 | Hongo | 382/25 |
| 4,783,829 | 11/1988 | Miyakawa et al. | 382/30 |
| 4,805,225 | 2/1989 | Clark | 382/15 |
| 4,845,765 | 7/1989 | Juvin et al. | 382/21 |
| 4,876,728 | 10/1989 | Roth | 382/21 |
| 4,906,940 | 3/1990 | Greene et al. | 382/16 |
| 4,914,708 | 4/1990 | Carpenter et al. | 382/14 |
| 4,965,725 | 10/1990 | Rutenberg | 382/15 |

FOREIGN PATENT DOCUMENTS 59-111575 of 1984 Japan .
60-204086 of 1985 Japan .
62-269287 of 1987 Japan .

Primary Examiner—Leo H. Boudreau
Assistant Examiner—Barry Stellrecht
Attorney, Agent, or Firm—Oblon, Spivak, McClelland, Maier & Neustadt

[57] ABSTRACT

A basic image of objects is extracted from a two-dimensional image of objects. Geometrical elements of the objects are extracted from the extracted basic image. The objects to be recognized are identified by searching a combination of the geometrical elements which match a geometrical model and then utilizing candidate position/orientation of the objects to be recognized, said candidate position/orientation being determined from a relationship in relative position between the combination of geometrical elements and the geometrical model. Mesh cells fixed to the geometrical model are mapped on the basic image based on the candidate position/orientation. In addition, verification is made as to whether an image of the geometrical model mapped by the candidate position/orientation is accurately matched with an image of one of the objects to be recognized, through a neural network to which values got from the basic image included in the individual mesh cells are to be applied as input values. Combination weight factors employed in the neural network are learned according to the verified results. It is also possible to recognize the multi-purpose objects according to how to learn the combination weight factors.

8 Claims, 11 Drawing Sheets

FIG.4(a)
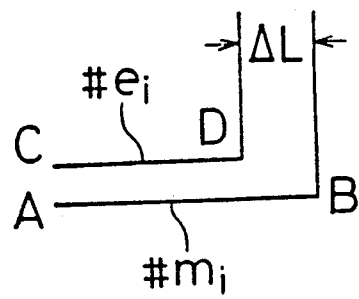
FIG.4(b)
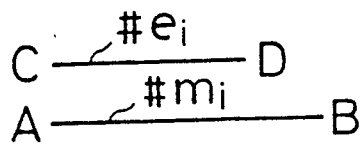
FIG.4(c)
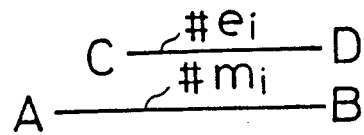
FIG.4(d)
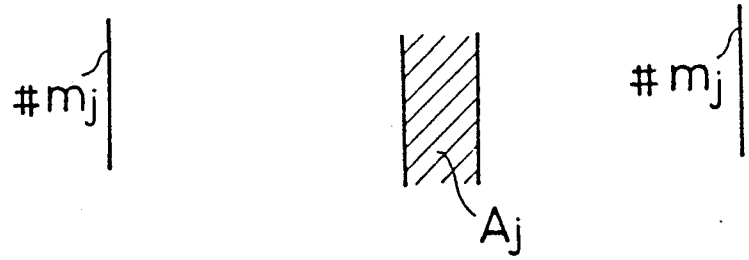
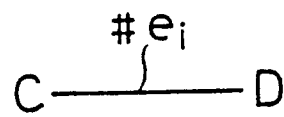
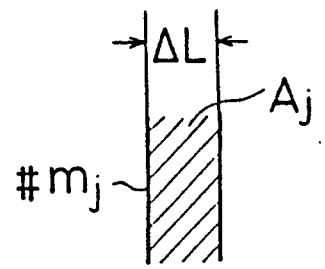
FIG.4(e)

n-th layer (Output layer)

Third layer

Second layer

First layer (Input layer)

Third layer (Output layer)

Second layer

First layer

TRUE CORRESPONDENCE
(TRUE ALIGNMENT)

FALSE CORRESPONDENCE
(FALSE ALIGNMENT)

FOREIGN OR DIFFERENT OBJECT

APPARATUS FOR VISUAL RECOGNITION

BACKGROUND OF THE INVENTION

1) Field of the Invention

The present invention relates to an apparatus for recognizing and locating a desired object from images including objects to be detected with high accuracy. Specifically, the present invention also relates to an apparatus which identifies a position/orientation of each object, judges whether or not each object is an intended one, extracts the uppermost object out of objects which are overlapped above and below, and checks whether each object is one with a flaw. The present apparatus can be applied to a visual recognition system suitable for use in a robot.

2) Description of the Prior Art

As one of apparatus for recognizing objects, the following apparatus has heretofore been known. In the apparatus, a scene including the object to be recognized is pictured and geometrical elements about the shapes of objects, for example, the fragments of corners, circles and straight lines representing objects and the like, are extracted from the resultant image data. The search is then made so as to select some of the geometrical elements of each object extracted, which match the geometrical model composed of model elements representing the shape of a model object which has been given in advance. Thus, a desired object can be recognized by the geometrical elements of each object, which are obtained as a result of such a search. This type of apparatus and the method for recognition of the objects are e.g. disclosed in Japanese Patent Laid-Open Nos. 111575/1984, 204086/1985 and 269287/1987.

The following is known to date as an alternative to the apparatus and the method for recognition of the objects described above. A position/orientation of each object to be recognized is detected using the fragments of corners and circles as parts of objects. The points on a contour line of each model, which has been mapped on the binary image, are next traced at an interval of a given distance. Costs corresponding to the results of a judgment made as to whether or not the contour line of each object extracted exists on the binary image at each point on the contour line are computed in simple manner over all the contour lines of the model. In addition, the sum of the costs are then compared with the predetermined threshold. When they exceed the predetermined threshold, the intended object is recognized as an object to be detected.

The former, i.e., the first method described above needs plenty of geometrical features extracted. So, such systems often produce miss-matching with bad location of object.

This is because there are few features such as a circle, a corner, a long straight line, etc. in shape of model. Even in the case of objects to be recognized having in abundance the features, using the present technology of the edge detection, it is difficult to detect such features sufficient for watching.

Matching the models of few features will often cause the case where they cannot be checked or where they are brought into false alignment.

On the other hand, the latter, i.e., the second method is not enough to solve the problem of the miss-matching judging from the following points:

(1) A method of providing the threshold is not automatic because of no provision of a learning means.

(2) Each of pseudo contour lines other than each contour line of desired each object to be recognized is often extracted under the influence of a shadow, noise caused by the illumination or an object with backgrounds, in the image recognition used for factory automation. Thus occurrence in miss-matching arises owing to extraction of each pseudo contour line and it results in low reliability in industrial application. Verification should be made also for the inside or outside of each object to be recognized, as well as each contour line of each object. Also verification should be performed as to whether or not each contour line exists at a position where the contour line should not be present. It is also necessary to provide a mechanism for closely observing positions where the shadows are liable to occur.

(3) In the field of application of visual recognition apparatus suitable for use in a robot, it is necessary to perform various inspections, for example, inspections of distinguishing different type of objects and flaws and a judgment as to whether or not overlapped part is located in a top position. In the second method, no realization is yet made with respect to a universal technique for learning information about which portion should closely be observed and verifying the same.

SUMMARY OF THE INVENTION

An object of this invention is therefore to improve the reliability in recognition of objects to be recognized.

Another object of this invention is to improve the reliability in recognition of objects to be recognized by making use of not only information about contour lines but information included in image regions other than the contour lines.

A further object of this invention is to improve the reliability in recognition of objects to be verified by mapping mesh cells fixed to model on images and obtaining the mesh cells as input values fed to a neural network.

A still further object of this invention is to execute a practical visual recognition with high reliability and with ease and multifunction, by performing a universal verification for conducting detection of miss-matching, inspections of foreign objects and flaws, a judgment as to whether each of parts overlapped is located in the top position, etc. and by performing learning of the verified various results.

According to a first feature of this invention, which is for solving the above-described problems, there is provided a visual recognition apparatus including a basic image extraction means A, a geometrical feature extraction means B, a geometrical modeling means E, a search means C, a verification means D and a learning means F as schematically shown in FIG. 1.

The basic image extraction means A is adapted to extract a basic image from a two-dimensional image of each object.

Here, as basic images mentioned above may be a gray image obtained by sampling, for each pixel, the level of lightness of image signals obtained by performing the raster scanning, using a two-dimensional image pick-up means, a binary image representing the level of lightness in binary form for each pixel, a color image representing color information in numerical form for each pixel, a line image obtained from the gray image, the binary image or color image, a differential image representing a gray image differentiated at plane coordinates, a three-dimensional distance image, etc. In other words, the basic image means an first image represented by processing the picture signal representing an object at first. In addition, the basic image also includes information about form of each object and represents an image for extraction of features of each object to be described later.

The geometrical feature extraction means B is one for extracting geometrical elements representing geometry of each object from the extracted basic image.

Here, the term "geometrical" may include, for example, geometric patterns such as a straight line, a circular arc, a circle, a corner, an elliptic curve, a hyperbolic curve, a parabola and a quadrangle. As information for specifying such elements may be considered, for example, a combination of position coordinates at one end or middle point with the length and inclination in the case of a straight line, as well as position coordinates at both ends thereof. In addition, as such information may be considered, for example, in the case of a curve, the type of the curve, a combination of position coordinates at both ends thereof with desired position coordinates on the curve, etc.

The geometrical modeling means E is one for producing a geometrical model for matching an object to be recognized, in combination with geometrical elements of each model, i.e., model elements.

Here, the term "geometrical models" may include a combination of geometrical elements capable of being extracted on the assumption of distinct ideal images of model objects which may include additional features, and also means a set with elements searched for in geometrical elements extracted in scene. Such a geometrical modeling means can be realized as a device of a type wherein after plotting the model objects by a CAD system or framing shapes of ideal model objects modified by subjecting images obtained by performing image-pick-up processings of the model objects to computer processings, model elements are specified on the screen, to thereby obtain information about the model elements by the computer processings. For example, this means is used as follows. The model elements are specified by moving a cursor on a computer display to indicate or teach, e.g., points of both ends of a straight line or three points on the circumference of a circle. They may be transferred from a conventional CAD system. They may be obtained by selecting some of geometrical features extracted by the above described means. In addition, information which specifies the model elements is produced in a form similar to that employed in information specifying geometrical elements extracted by the extraction means. Then information about the structural or relative position between model elements within the same models is produced, to thereby store the resultant information in this means.

The search means C is one for searching extracted elements, which coincide with the geometrical models, and for locating the objects to be recognized using a relative distance between the geometrical model and geometrical extracted elements.

This means is also one for selecting combinations of geometrical elements extracted, which matches the geometrical models. Information about the candidate position/orientation can be represented in a form of a mapping matrix which associates the geometrical model with a set with extracted elements selected above.

The verification means D is one for mapping mesh cells within the region fixed to the geometrical model on the basic image using the candidate position/orientation and for verifying whether or not the candidate position/orientation accurately matches the object to be recognized, through a neural network to which values based on the basic image included in individual mesh cells are to be applied as input values.

In other words, when each of the geometric model is mapped on each basic image at a detected position, each value obtained from each basic image corresponding to the individual cells for a mesh, which are fixed to the geometric model, is inputted to the neural network. It is then judged by the neural network whether or not the objects to be recognized have accurately been recognized.

As information obtained from each basic image may be mentioned, for example, the presence of edge lines within individual cells in the case of line images, color values of pixels at the center of each cell in the case of color images, the average of gray values of pixels within the cells in the case of gray images, the number of black pixels within the cells in the case of binary images, three-dimensional values of pixels at the center of each cell in the case of distance images, etc. It is unnecessary to cause the type of each basic image as information to be inputted to the neural network to coincide with that of each basic image for extracting geometrical elements of objects. A plurality of pixels may exist within individual cells in the case of a plurality of basic images. Otherwise, one cell may be represented by one pixel.

The learning means F is one for modifying combination weight factors of the neural network using the verified results and teacher signals for providing the evaluation value with respect to the truth of the verified results.

The combination weight factors employed in the neural network are successively corrected by learning operations of the learning means F so that the results obtained by the verification means D. Through the training, neural network become truer.

A true or false value for individually evaluating position/orientation candidates, which is outputted from the search means C, is set as a teacher signal and the combination weight factors of the neural network are modified in accordance with changes in the true or false value and values outputted from the neural network. The learning for modification of the combination weight factors is then repeatedly performed with respect to many cases to be trained until the deviation between the true or false value and one of the outputted values converges to zero.

A description will next be made on the operation of the apparatus representing the first feature of this invention.

Each of basic images is extracted from a two-dimensional image of each object by the basic image extraction means A and geometrical elements representing geometry of each object are extracted from basic image by the geometrical feature extraction means B.

On the other hand, a geometrical model composed of model elements representing geometrical features which have been produced in advance by the geometrical modeling means E.

The matching of geometrical model with geometrical elements of an object to be recognized is successively executed so as to search extracted elements which match model elements by means of the search means C. As a result of its search, information about a candidate position/orientation for identifying a candidate of an object to be recognized can be obtained.

Next, the verification means D is adapted to map geometrical model on each basic image using the information about the candidate position/orientation and then verify whether or not the candidate of the object to be recognized is an object to be formally recognized, through the neural network to which information about each basic image obtained in association with the individual cells for the mesh, which are fixed to the geometrical models, is to be applied thereto as an input value.

On the other hand, the combination weight factors of the neural network are modified using the verified results as outputs from the neural network, which are obtained in the above-described manner, and the teacher signals for providing the evaluation value with respect to the truth of the verified results. The verified results from the neural network are thus brought to the higher truth as a result of the learning of the combination weight factors with respect to many cases to be recognized.

Incidentally, if each object to be recognized is fixed at a known position/orientation of each model, and teacher signal is set as a true or false value representing the degree of consistency of information about a position/orientation candidate, which is outputted from the search means C with that about the known position/orientation, each teacher signal can automatically be produced.

BRIEF DESCRIPTION OF THE DRAWINGS

The above and other objects, features and advantage of the present invention will become apparent from the following description and the appended claims, taken in conjunction with the accompanying drawings, in which:

FIGS. 3(a), 3(b) and 4(a) through 4(e) diagrammatically illustrate the manner of calculation of relative consistency between straight lines which represent geometrical elements;

DETAILED DESCRIPTION OF THE PREFERRED EMBODIMENTS

The present invention will hereinafter be described in accordance with one specific embodiment.

Figure 1:
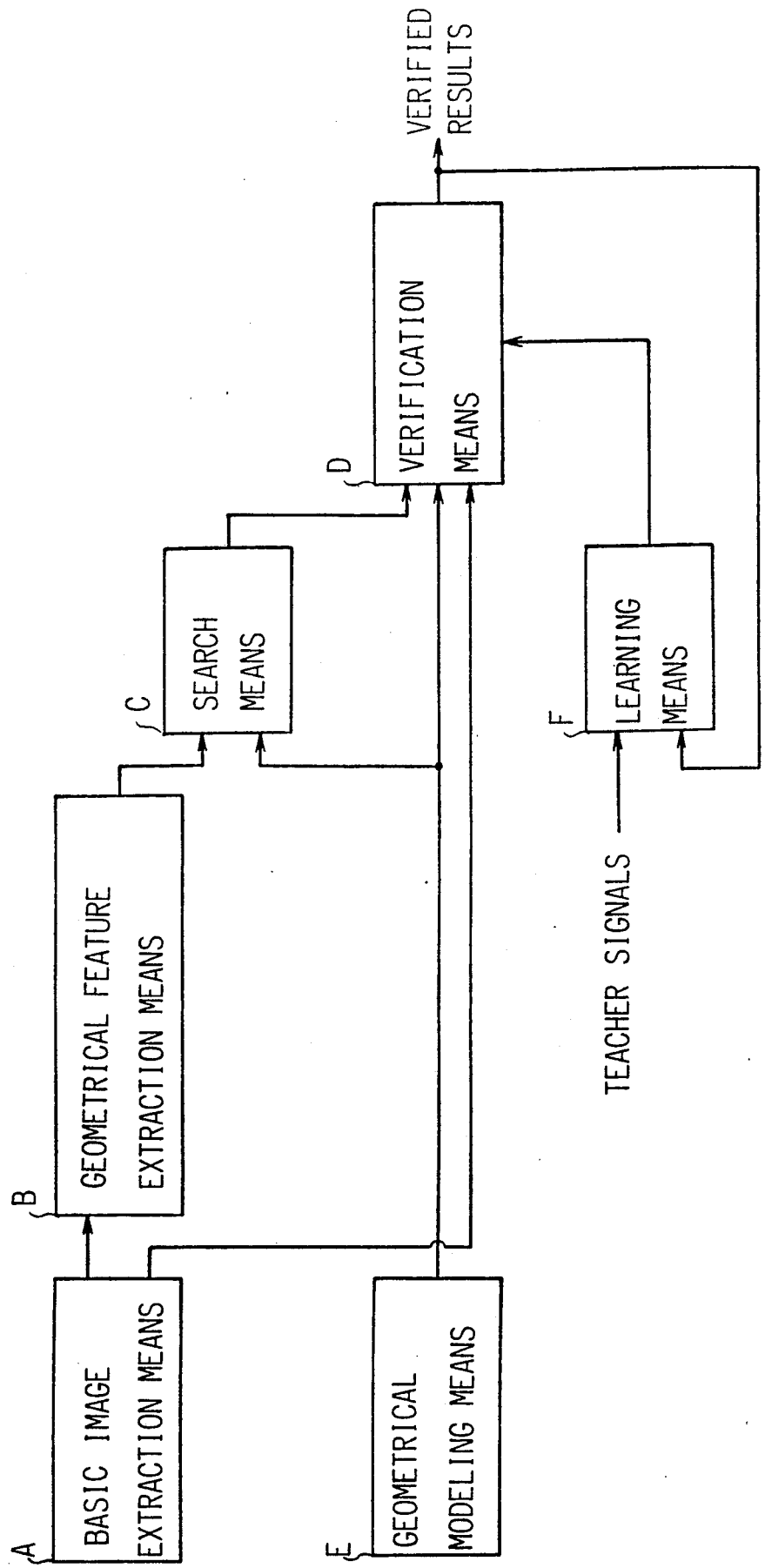
FIG. 1 is a block diagram showing the concept of one of features according to the invention.
Figure 2A:
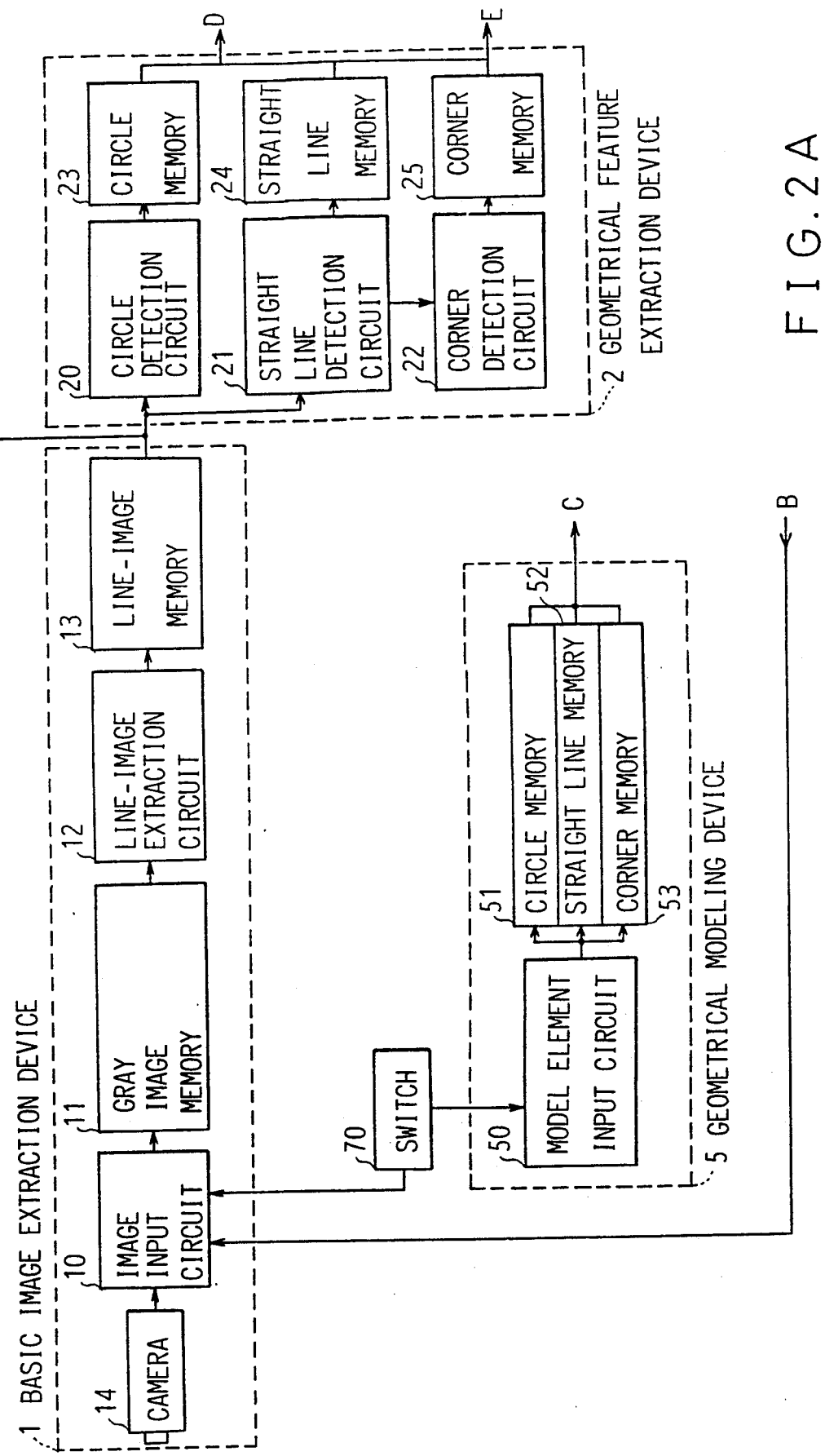
FIGS. 2A and 2B are a block diagram showing the construction of a visual recognition apparatus according to one specific embodiment of the invention.
Figure 2B:
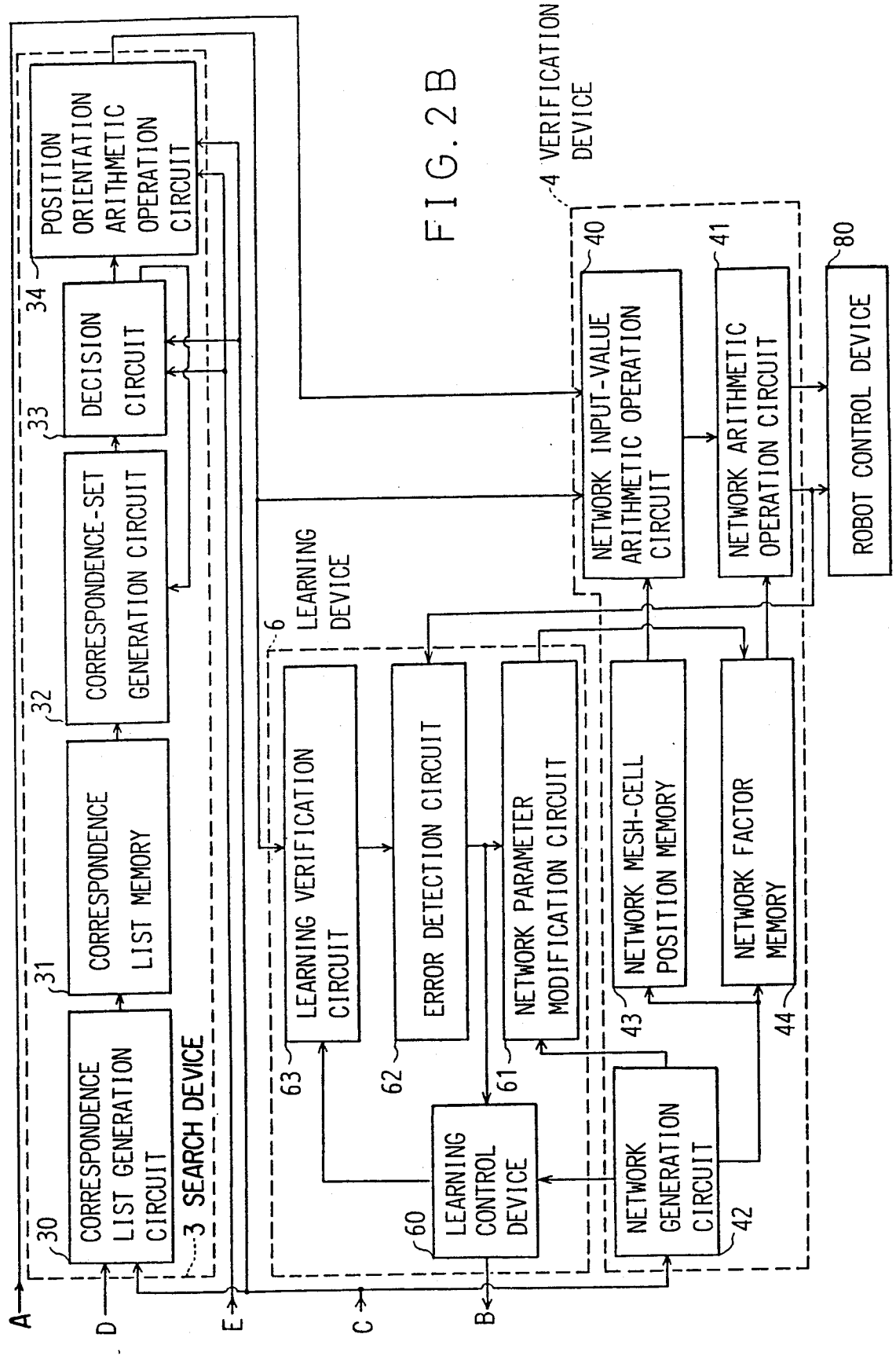

As shown in FIG. 2, a visual recognition apparatus is constructed principally of a basic image extraction device 1, a geometrical features extraction device 2, a search device 3, a verification device 4, geometrical modeling device 5 and a learning device 6.

1. Basic Image Extraction Device

The basic image extraction device 1 is made up of a camera 14, an image input circuit 10, a gray image memory 11, a line-image extraction circuit 12 and a line-image memory 13.

(1) Image Input Circuit and Gray Image Memory

Image signals are taken out by scanning an electronic image of an object, which is photographically recorded by the camera 14, to sample the same corresponding to the pixel coordinates on a light-receiving surface, to thereby digitize the sampled signals into the level of lightness of 256. The digitized data is then stored in each address corresponding to the pixel coordinates in the gray image memory 11 so as to produce a gray image.

(2) Line-Image Extraction Circuit

The line-image extraction circuit 12 is constructed of an unillustrated differentiating circuit, a differential image memory and a contour-line extraction circuit.

The differentiating circuit is adapted to calculate the gradient of lightness on the coordinates of individual pixels of a gray image, which has been stored in the gray image memory 11 and then store the results in the differential image memory, to thereby form a differential image.

The arithmetic operation of the gradient of lightness is performed by a sobel operator using lightness of each of pixels which are divided into a mesh form of 3×3 points, including moving points P on the coordinates of the pixels. The term "Sobel Operator" designates the arithmetic operation of a lightness gradient (fx, fy) at the moving point P performed in accordance with the following equations when the lightness of each pixel having 3×3 points is taken as a to i.

$$fx = c + 2f + i - (a + 2d + g) \quad (1)$$

$$fy = g + 2h + i - (a + 2b + c) \quad (2)$$

Such a differential operation performed by the sobel operator is fixed up by a product/sum arithmetic operation unit.

The contour-line extraction circuit is one for receiving a differential image from the differential image memory to extract a contour line, i.e. an edge line (including a quasi-contour line as a noise) of the image, thereby forming the same at the line-image memory 13.

It has been known that the absolute value of the lightness gradient of points on a contour line of an image becomes greater as compared with that of points around the contour line. Accordingly, the sequence of points constituting the contour line can be determined by performing the following operation successively. In other words, it is first performed to detect points in the case where the absolute values of the lightness gradients at the moving points P on the coordinates of the pixels are larger than predetermined values and not smaller than those around the contour line, to thereby define the detected points as starting points, and to select adjacent pixels which are present in the direction perpendicular to the direction of the lightness gradient, as points on the contour line adjacent the starting points and thereafter select points on the following contour line from the lightness gradient at the thus-selected points, taking the selected points as criteria.

The line images are constructed by representing the points of the contour line with the level of lightness having 256 grades and representing other points with the level of zero. The line images are stored in the line-image memory 13.

2. Geometrical Feature Extraction Device

The geometrical feature extraction device 2 is constructed of a circle detection circuit 20, a circle memory 23, a straight line detection circuit 21, a straight line memory 24, a corner detection circuit 22 and a corner memory 25.

(1) Circle Detection Circuit

The circle detection circuit 20 is adapted to take or read out a sequence of a successive points on a contour line from the line-image memory 13 so as to define the sequence of the successive points as a circle when the orientation represented by vectors between positions of the points defined for each constant interval is substantially changed centripetally, thereby specifying the circle with the central coordinates and radius thereof, followed by storing the resultant data in the circle memory 23 for each circle.

(2) Straight Line Detection Circuit

The straight line detection circuit 21 is adapted to read out a sequence of successive points on a contour line form the line-image memory 13 so as to define the sequence of the points as a straight line fragment when the orientation represented by vectors connecting between positions of the points defined for each constant interval is substantially similar, thereby specifiying the straight line with position coordinates at the points of both ends of the fragment, followed by storing the data about the straight line in the straight line memory 24 for each straight line.

(3) Corner Detection Circuit

The corner detection circuit 22 is adapted to consider that when the end points of two straight lines are located close to each other, a corner is formed by the two lines, and to specify the corner with position coordinates at the intersection of the two lines, an angle formed by the two lines extending from the same point and the direction of a straight line that bisects the angle, followed by storing the data about the corner in the corner memory 25 for each corner.

3. Geometrical Modeling Device

The geometrical modeling device 5 is constructed of a model element input circuit 50, a circle memory 51, a straight line memory 52 and a corner memory 53.

(1) Model Element Input Circuit

The model element input circuit 50 is designed to form or specify model elements by moving a cursor on a computer display, to thereby generate data about geometrical models. In other words, the model elements are produced or specified by specifying positions at points of both ends of a straight line in the case where the model element constitutes the straight line, three positions on the circumference of a circle in the case where the model elements represent the circle and two straight lines defining a corner in the case where the model elements represent the corner so as to generate data about the model elements in the same form as that of data about the geometrical elements generated by the geometrical feature extraction device 2. In addition, these data are stored in the circle memory 51, the straight line memory 52 and the corner memory 53 respectively corresponding to the circle, straight line and corner.

4. Search Device

The search device 3 is made up of a correspondence list generation circuit 30, a correspondence list memory 31, a correspondence-set generation circuit 32, a decision circuit 33 and a position/orientation arithmetic operation circuit 34.

(1) Correspondence List Generation Circuit

Each of geometrical elements, which is capable of matching each of model elements, is first chosen at a check stage, to thereby form the sum of a primary correspondence pair or set $L_1$.

The primary correspondence set $L_1$ is defined by the following equation:

$$L_1 = \{(m_i, e_j, \rho_{1i,j} | m_i \epsilon M, e_j \epsilon E, i = 1 \ldots p, j = 1 \ldots q\} \quad (3)$$

where
p = number of model elements
q = number of extracted geometrical elements
M = set of model elements
E = set of geometrical elements Next, the combination having the same kinds (three kinds: circle, corner and straight line) of geometrical elements and the degree of consistency $\rho_1$ greater than the given threshold remain valid.

The degree of consistency $\rho_1$ is calculated by using the length of the straight line in the case of the straight line, the radius of the circle in the case of the circle, and the angle of the corner in the case of the corner.

In the case of the straight line, the degree of consistency $\rho_1$ is determined by the following equation:

$$\rho_1 = \left\{ 1 - \left| \frac{\text{Len}(m_k) - \text{Len}(e_k)}{\text{Len}(m_k)} \right| \right\} \times 0.3 \quad (4)$$

where $\text{Len}(m_k)$, $\text{Len}(e_k)$ = lengths of straight lines composed of model and geometrical elements respectively, In the case where elements are circle and corner, the degree of consistency $\rho_1$ is calculated from the equation (4) by replacing Len with Rad (radius of circle) and Ang (angle of corner) and by further setting the final constant term to 0.5 in the case of the circle and setting the term to 0.2 in the case of the corner.

The primary correspondence set in which the degree of consistency $\rho_1$ exceeds the predetermined threshold is selected in the above-described manner. This set is stored in the correspondence list memory 31 in the form of a set of geometrical elements and model elements and each degree of consistency ($m_i$, $e_j$, $\rho_{1i}$, $j$).

(2) Correspondence Set Generation Circuit

The correspondence set generation circuit 32 serves to generate a high-order correspondence set in accordance with a predetermined logic while receiving a primary correspondence set ($m_i$, $e_j$) from the correspondence list memory 31.

A k−1 order correspondence set obtained by terminating search in success at the present time is established as follows:

$$C = (\#m_1, \ldots, \#m_{k-1}, \#e_1, \ldots, \#e_{k-1}) \quad (5)$$

where the terms $\#m_1, \ldots, \#m_{k-1}, \#e_1, \ldots, \#e_{k-1}$ represent elements in the case where model elements are associated with geometrical elements, so that they match each other in the respective search level, and also represent symbols which have been applied in a new form.

Where the search is terminated in success under the k−1 order correspondence set, it is judged by the decision circuit 33 that the degree of consistency $\rho_{k-1}$ of the k−1 order correspondence set expressed by the equation (5) exceeds a predetermined first threshold $\rho_L$. As a result of this judgment, a "NEXT" signal is outputted to the correspondence set generation circuit 32 from the decision circuit 33. The correspondence set generation circuit 32 is responsive to the "NEXT" signal for selecting the following new primary correspondence set from the correspondence list memory 31. The selected primary correspondence set is established as ($\%m_k$, $\%e_k$). Here, ($\%m_k$, $\%e_k$) are general symbols which have been applied to the selected primary correspondence set in a new form in order to produce a k-order correspondence set. The k-order correspondence set of an object to be next searched or recognized, in which the selected primary correspondence set is incorporated therein, is represented by:

$$C = (\#m_1, \ldots, \#m_{k-1}, \%m_k, \#e_1, \ldots, \#e_{k-1}, \%e_k) \quad (6)$$

The degree of consistency $\rho_k$ is arithmetically operated with respect to the present k-order correspondence set of the equation (6) by the decision circuit 33. Where the degree of consistency $\rho_k$ is smaller than the predetermined first threshold $\rho_L$, a "false" signal is outputted to the correspondence set generation circuit 32. The correspondence set generation circuit 32 selects the following another primary correspondence set ($\%m_k$, $\%e_k$) in response to the "false" signal, to thereby generate a correspondence set of an object to be next searched, which is similar to that calculated in the equation (6). Where the "false" signal is outputted from the decision circuit 33, the above-described processings are repeatedly performed, so that the correspondence sets of objects to be searched are successively brought up to date. Each of model elements $\%m_k$ of new primary correspondence sets ($\%m_k$, $\%e_k$) is first fixed and each of geometrical elements $\%e_k$ corresponding to the model element $\%m_k$ is selected from each of the new primary correspondence sets successively. When only the geometrical element $\%e_k$ is finally left, the following another model element $\%m_k$ is selected and a geometrical element $\%e_k$ corresponding to the model element $\%m_k$ is selected from the primary correspondence set.

On the other hand, when it is judged by the decision circuit 33 that the degree of consistency $\rho_k$ of the k-order correspondence set defined by the equation (6), which has been determined in the above-described manner, exceeds a predetermined first threshold $\rho_L$, a "NEXT" signal is outputted to the correspondence set generation circuit 32 from the decision circuit 33. When the "NEXT" signal is outputted, the correspondence set generation circuit 32 extracts the following new primary correspondence set $\%m_{k+1}$, $\%e_{k+1}$) from the correspondence list memory 31 so as to generate the next k+1 order correspondence set, which is in turn expressed by the following equation:

$$C = (\#m_1, \ldots, \#m_k, \%m_{k+1}, \#e_1, \ldots, \#e_k, \%e_{k+1}) \quad (7)$$

High-order correspondence sets are produced successively in the above-described manner and geometrical elements corresponding to model elements are searched.

The degree of consistency $\rho_k$ of the present correspondence set to be searched is arithmetically-operated by the decision circuit 33. When it is judged that the degree of consistency $\rho_k$ exceeds a second threshold $\rho_H$, it is determined that the matching of model elements with geometrical elements has been succeeded, so that a "true" signal is outputted to the correspondence set generation circuit 32. The correspondence set generation circuit 32 thereafter serves to suspend generating correspondence sets in response to the "true" signal. And also when the verification result output from the verification device 4 represents false correspondence, the circuit 32 resumes the search from the suspended point.

(3) Decision Circuit

The degree of consistency $\rho_k$ at the time of matching between the geometrical elements and model elements is computed with respect to the present k-order correspondence set to be searched, which is to be generated by the correspondence set generation circuit 32. When the degree of consistency $\rho_k$ does not exceed the first threshold $\rho_L$, a "false" signal is supplied to the correspondence set generation circuit 32. On the other hand, when the degree of consistency $\rho_k$ exceeds the second threshold $\rho_H$, the matching between the geometrical elements and model elements is succeeded, so that a "true" signal is outputted to the correspondence set generation circuit 32 and the position/orientation arithmetic operation circuit 34. Otherwise, i.e., when the degree of consistency $\rho_k$ falls between $\rho_L$ and $\rho_H$, = i.e., $\rho_L \leq \rho_k \leq \rho_H$, a "NEXT" signal is outputted to the correspondence set generation circuit 32.

Incidentally, $\rho_L$ and $\rho_H$ are empirically set to 0.1 and 0.6 in the present embodiment ($\rho_L = 0.1$ and $\rho_H$ 0.6).

The degree of consistency $\rho_1$ and the results obtained by evaluating a relationship in relative position between respective elements in the primary correspondence set are employed in the arithmetic operation of the degree of consistency $\rho_k$. Such a relationship in position relative to each other is as follows by way of example. When elements are both circles, the relationship in relative position is defined by the distance between centers of the circles, while when elements are a circle and straight line, its positional relation is defined by the distance between the center of a circle and one of points of both ends of the straight line and the distance between its center and the other thereof, and the length of a line at right angles to the straight line from the center of the circle.

The degree of consistency $\rho_k$ of the k-order correspondence set is defined by the following expression:

$$\rho_k = \frac{1}{P}\sum_{i=1}^{k}\rho_1(\#m_i, \#e_i) + \frac{2}{P(P-1)}\sum_{i,j=1}^{k}\rho_r(\#m_i, \#m_j, \#e_i, \#e_j) \quad (8)$$

where
P = number of model elements
$\rho_1$ (#$m_i$, #$e_i$) = degree of consistency of primary correspondence set (#$m_i$, #$e_i$)
$\rho_r$ (#$m_i$, #$m_j$, #$e_i$, #$e_j$) = degree of consistency between relative positions of model elements (#$m_i$, #$m_j$) and those of geometrical elements (#$e_i$, #$e_j$)
This last-mentioned degree of consistency will hereinafter be called "degree of relative consistency", which is in turn merely taken as $\rho_r$.

The degree of relative consistency $\rho_r$ is determined b the following equation.

(a) when #$m_i$ and #$m_j$ are both circles:
When the distance between the centers of the two circles of the model elements is denoted by d(#$m_i$, #$m_j$) and that of the corresponding geometrical elements is denoted by d(#$e_i$, #$e_j$), the degree of relative consistency $\rho_r$ is represented by:

$$\rho_r = \left\{1 - \left|\frac{d(\#m_i, \#m_j) - d(\#e_i, \#e_j)}{d(\#m_i, \#m_j)}\right|\right\} \times 0.5 \quad (9)$$

In other words, the degree of relative consistency $\rho_r$ is a value corresponding to 0.5 at the maximum when the distance between the centers of two model elements is equal to the distance between the centers of two geometrical elements. The more the two intervals is different from each other, the more the degree of relative consistency $\rho_r$ approaches zero, where $\rho_r$ is equal to $-\infty$ when $\rho_r < \rho_L$.

(b) when #$m_i$ and #$m_j$ are both corners:
Assuming that the distance between points converged at corners is taken as d(#$m_i$, #$m_j$), d(#$e_i$, #$e_j$), the degree of relative consistency can be determined in the same manner as in the equation (9).

Figure 3A:
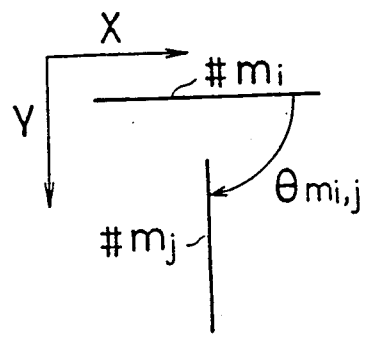
Figure 3B:
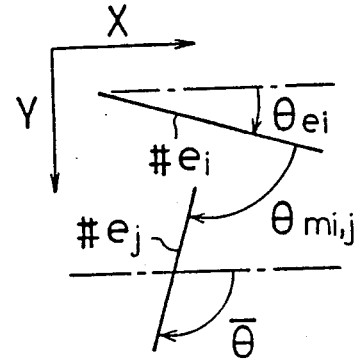

(c) when #$m_i$ and #$m_j$ are both straight lines:
As shown in FIG. 3, when an angle formed by model elements #$m_i$ and #$m_j$ is taken as $\theta_{m_{i,j}}$ and an angle formed by an X axis of plane coordinates and a geometrical element #$e_i$ is taken as $\theta_{ei}$, an expected value of an angle formed by the geometrical element #$e_j$ to match the model element #$m_j$ and the X axis is taken as $\bar{\theta}$. Thus, the expected value $\bar{\theta}$ can be determined by the following equations.

However, the equation of (10) or (11) is selected so as to meet $-\pi/\leq\bar{\theta}\leq\pi/2$.

$$\bar{\theta} = \theta_{ei} + \theta_{m_{i,j}} \quad (10)$$

$$\bar{\theta} = \theta_{ei} + \theta_{m_{i,j}} \pm \pi \quad (11)$$

It is next practiced to determine an actual angle $\theta_{ej}$ formed by the geometrical element #$e_j$ and the X axis. The degree of orientation or attitude collation $U_1$ is calculated by the following equation:

$$U_1 = \{1 - 2|\bar{\theta} - \theta_j|/\pi\} \times 0.2 \quad (12)$$

When the geometrical element #$e_i$ is associated with the model element #$m_i$, an existence possibility region $A_j$ of the geometrical element #$e_j$ is determined from the connection in relative position between the model elements #$m_i$ and #$m_j$. The region $A_j$ is determined in the following manner.

As shown in FIG. 4(a), where the model element #$m_i$ is associated with the geometrical element #$e_i$, the indeterminacy $\Delta L$ exists owing to the difference in length therebetween. As methods for causing the model element to correspond with the geometrical element may be mentioned, for example, one for causing an end point A of the model element #$m_i$ to coincide with an end point C of the geometrical element #$e_i$ as shown in FIG. 4(b), and another for causing an end point B of the model element #$m_i$ to coincide with an end point D of the geometrical element #$e_i$ as shown in FIG. 4(c). The existence possibility region of the geometrical element #$e_j$ to be matched relative to the model element #$m_j$ corresponds to a region defined by shifting the model element #$m_j$ by $\Delta L$. This region can exist on both sides of the geometrical element #$e_i$ from the standpoint that it can intentionally be rotated over 180°.

It is next performed to verify whether or not the geometrical element #$e_j$ is included in the existence possibility region $A_j$. According to the degree that it is included in the region, the degree of region collation $U_2$ is calculated by each of the following equations:

$$\begin{aligned}U_2 &= 0.5 \quad \text{(when all the geometrical elements are included)} \\ &= 0.25 \quad \text{(when some is included)} \\ &= 0 \quad \text{(when none of the geometrical elements is included)}\end{aligned} \quad (13)$$

and the degree of relative consistency $\rho_r$ is computed by the following equation:

$$\rho_r = U_1 + U_2 \quad (14)$$

(d) when one of #$m_i$ and #$m_j$ is a circle and the other is a corner:
The degree of relative consistency $\rho_r$ is calculated from the equation (9), in which the distance between the center of the circle and the point converged at the corner of the model elements is denoted by d(#$m_i$, #$m_j$) and that of the corresponding geometrical elements is denoted by d(#$e_i$, #$e_j$).

Figure 5:
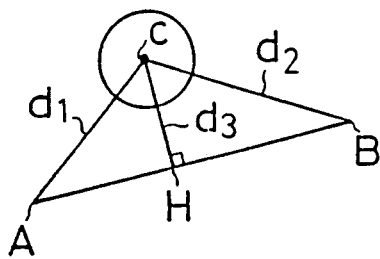
FIG. 5 diagrammatically depicts the manner of calculation of relative consistency between a straight line and a circle which represent geometrical elements.

(e) when one of #$m_i$ and #$m_j$ is a circle and the other is a straight line:
As shown in FIG. 5, let's denote the distances AC and BC between the center C of the circle and the respective points A and B of ends of the straight line by $d_1$ and $d_2$, and denote the length HC of a perpendicular from the center C of the circle to the straight line by $d_3$. If $d_1(\#m_i, \#m_j) < d_1(\#e_i, \#e_j)$ or $d_2(\#m_i, \#m_j) < d_2(\#e_i, \#e_j)$, the degree of relative consistency $\rho_r$ is set to $-\infty (\rho_r = -\infty)$.

With the exception of the above-described case, the equation of the degree of relative consistency $\rho_r$ is given by replacing d by $d_3$ in the equation (9).

(f) when one of #$m_i$ and #$m_j$ is a corner and the other is a straight line:
This example (f) is similar to an example in the case where the center of the circle employed in the above example (e) is replaced by the point converged at the corner.

(4) Position/Orientation Arithmetic Operation Circuit

The position/orientation arithmetic operation circuit 34 is adapted to calculate the position/orientation of an object to be recognized, from n model elements and n geometrical elements in a correspondence set which is outputted from the decision circuit 33 and obtained by terminating its search in success.

Figure 6:
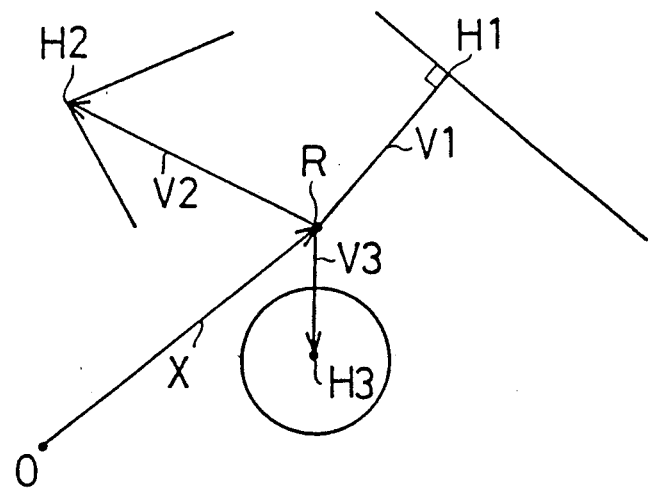
FIG. 6 diagrammatically shows the manner of calculation of the position and orientation.

An algorithm is as follows:

Step 1: calculation of the quantity of translation:

Each of reference points of models and objects to be recognized is determined from positions where individual elements are arranged. As shown in FIG. 6, the reference point R of a model and an object is determined as a position where the sum of the absolute values of displacement vectors V1,V2,V3, ... corresponding to reference points (a point H1 where a line perpendicular to a straight line terminates, a point H2 converged at a corner of two straight lines and the center H3 of a circle) of respective elements relative to a position vector X at each model and each object becomes minimal.

The position vectors $X_m$ and $X_e$ to minimize the Square Sum ($|V1|2+|V2|2+|V3|2+...$) are determined by the method of least squares with respect to both of the model and object to be recognized. A vector representing translation between the model and the object is given by $X_m - X_e$.

Step 2: calculation of the quantum of rotation:

After the model is displaced in parallel so that the position vectors $X_m$ coincides with the position vector $X_e$, angles $ang(V1_m, V1_e)$, $ang(V2_m, V2_e)$, $ang(V3_m, V3_e)$, ... respectively formed by the two corresponding displacement vectors $Vi_m$ and $Vi_e$ of the model and the object to be recognized are calculated. The angles are averaged to obtain an angle $\theta$. That is, $$\theta = \frac{1}{n} \sum_{i}^{n} ang(Vi_m, Vi_e) \quad (15)$$

where $\theta$ = angle of rotation of object relative to model,

Here, where elements constitute a parallel straight line or concentric circle when n=1 and n=2, the position/orientation of the object cannot be determined. It is therefore necessary to perform a special error processing.

An output from the position/orientation arithmetic operation circuit 34 is a transformation matrix by homogeneous coordinates representation from the orientation/position of the model to the orientation/position of the object to be recognized. The transformation is expressed as follows:

$$\begin{bmatrix} R_{11} & R_{12} & P_x \\ R_{21} & R_{22} & P_y \\ 0 & 0 & 1 \end{bmatrix} = \begin{bmatrix} \cos\theta & -\sin\theta & P_x \\ \sin\theta & \cos\theta & P_y \\ 0 & 0 & 1 \end{bmatrix} \quad (16)$$

$$P_x = X_{ex} - R_{11} \cdot X_{mx} - R_{12} \cdot X_{my}$$
$$P_y = X_{ey} - R_{21} \cdot X_{mx} - R_{22} \cdot X_{my}$$

where $X_{mx}$, $X_{my}$ and $X_{ex}$, $X_{ey}$ are the x, y-components of the position vector $X_m$ of the model and the x, y-component of the position vector $X_e$ of the object, respectively.

5. Verification Device

The verification device 4 is adapted to map a model on the line-image memory 13 by using a orientation/position matrix which is an output from the position/orientation arithmetic operation circuit 34 in the search device 3 to process the information obtained therein, thereby judging whether or not each of objects is an object to be truly recognized. The verification device 4 is constructed of a network input-value arithmetic operation circuit 40, a network arithmetic operation circuit 41, a network generation circuit 42, a network mesh-cell position memory 43 and a network factor memory 44.

(1) Network Generation Circuit

Figure 7:
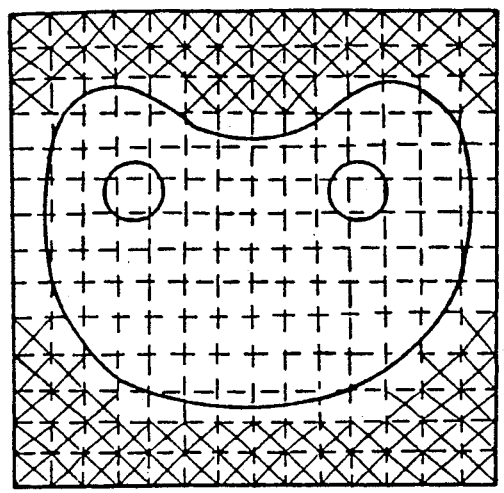
FIG. 7 diagrammatically illustrates mesh cells which are fixed to a model.

As shown in FIG. 7, the network generation circuit 42 serves to establish windows mapped on objects within predetermined regions fixed to geometrical models. The windows are divided in a predetermined width by the present circuit so as to produce cells forming a mesh, i.e., mesh cells. Of these mesh cells, mesh cells which exist outwardly of models unnecessary to verify are eliminated. In order to associate the remaining mesh cells with input elements in the network input-value arithmetic operation circuit 40 provided in the verification device 4, information about a corresponding relationship therebetween is stored in the network mesh-cell position memory 43.

By making use of the number of layers, which are externally given, in the network arithmetic operation circuit 41, regions, in which elements and combination weight factors (product/sum factors) employed in the network arithmetic operation circuit 41 are stored in association with individual output and input elements, are set within the network factor memory 44.

(2) Network Input-value Arithmetic Operation Circuit

Figure 8:
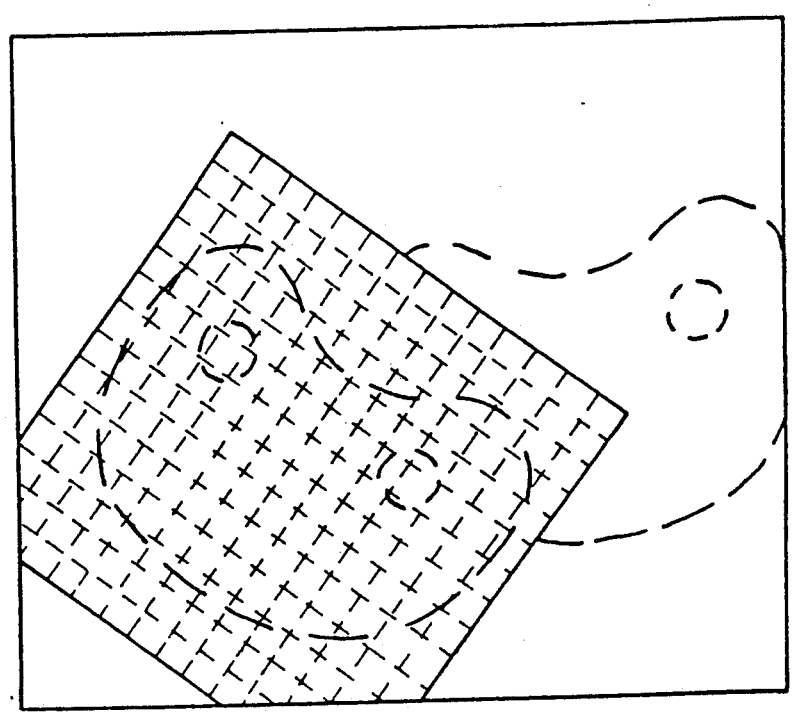
FIG. 8 is an illustration showing the geometry of an image mapped on a line-image surface of the mesh cells.

The network input-value arithmetic operation circuit 40 functions in the following manner. This circuit 40 receives a position/orientation matrix of the object, i.e., the transformation matrix, which is outputted from the position/orientation arithmetic operation circuit 34. In addition, the mesh fixed to the model, the position data of which have been stored in the network mesh-cell position memory 43 is displaced and rotated by the position/orientation matrix to be mapped on the line-image formed on the line-image memory 13 as shown in FIG. 8, thereby determining input values from the data stored at the respective addresses on the line-image memory 13 corresponding to respective cells for the mesh. The network arithmetic operation circuit 41 functions as a neural network. The number of inputs is associated with that of effective cells of the mesh.

In the present embodiment, an output delivered to the network arithmetic operation circuit 41 is set to "+1" if an edge-line of the object exists in individual cells of the mesh or set to "−1" if not.

Figure 9:
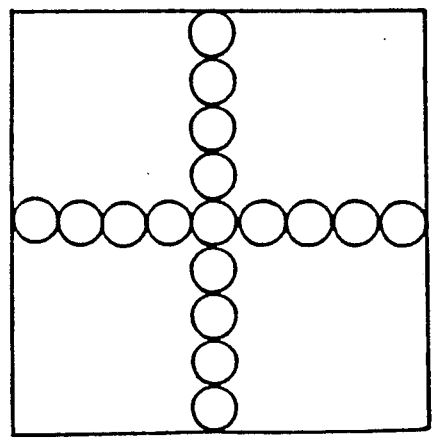
FIG. 9 diagrammatically depicts the manner of detecting whether or not the contour line of an image within the mesh cells exist.

Incidentally, in order to reduce quantities of arithmetic operation with respect to the judgment made as to whether or not the edge-line exists, a hypothesis is made, for each cell, which causes cross patterns to exist over pixels corresponding to the respective addresses of the line-image memory 13 as shown in FIG. 9. In this case, if edge-lines of the object to be recognized exists in any pixel on the cross patterns, it is judged that the edge-line exists in the individual cells.

(3) Network Arithmetic Operation Circuit

Figure 10:
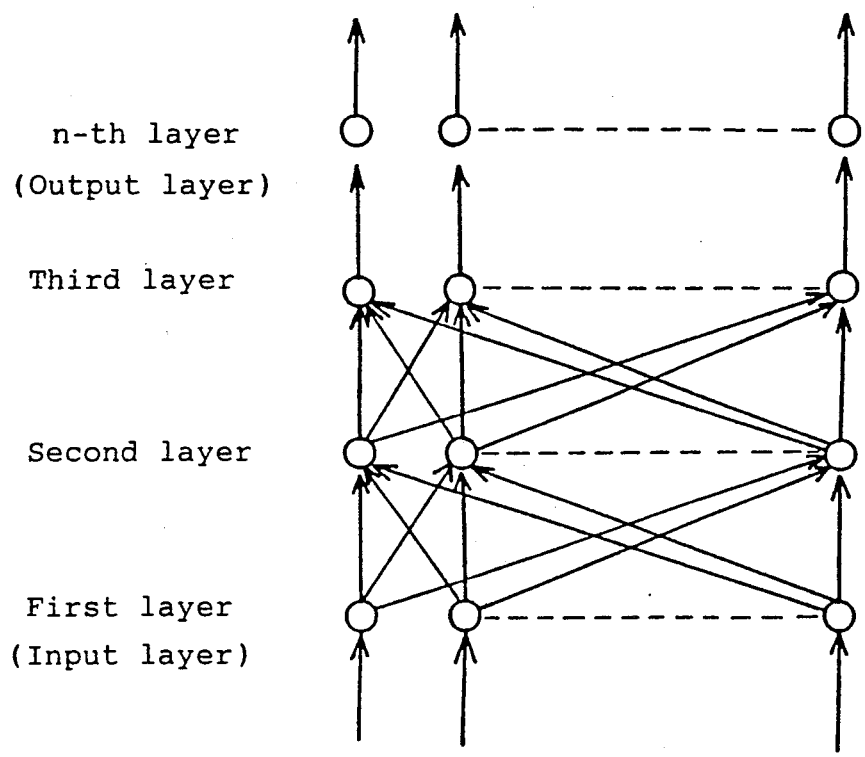
FIG. 10 diagrammatically illustrates the structure showing a normal neural network.

The network arithmetic operation circuit 41 generally functions as a neural network as shown in FIG. 10. An output $O_j^i$ of a j-th element at an i-th layer is calculated by the following equations:

$$O_j^i = f(I_j^i) \quad (i \geq 2) \tag{17}$$

$$I_j^i = \sum_k W_{kk_{ij}}^{i-1,i} \cdot O_k^{i-1} + V_j^i \tag{18}$$

$$f(x) = 1/\{1 + \exp(-x)\} \tag{19}$$

where
- $V_j^i$ = bias of j-th operation element at i-th layer
- $W_k^{i-1,i}$ = combination weight factor between j-th element a i-th layer and k-th element at (i−1)th layer
- $O_j^i$ = input value of j-th element at the first layer, i.e., value outputted from j-th cell in network arithmetic operation circuit 41

Figure 11:
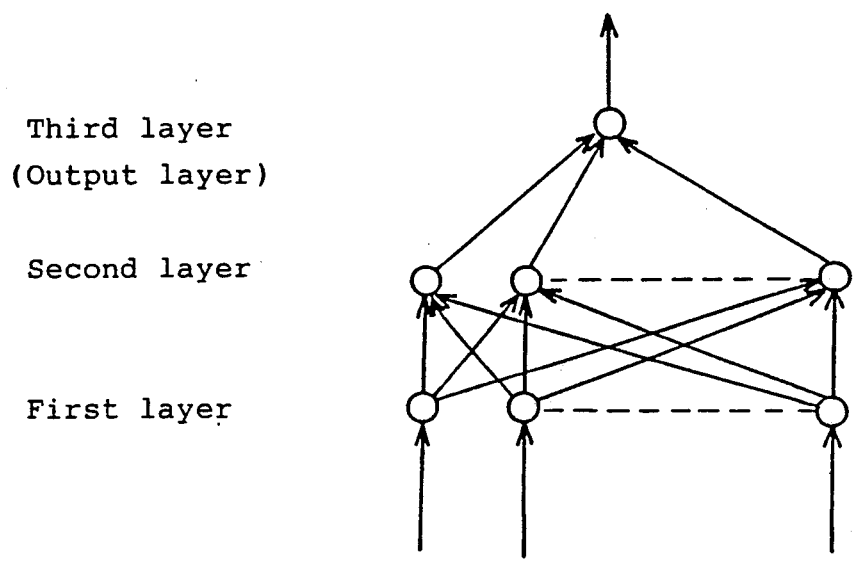
FIG. 11 structurally shows a specific neural network according to the present embodiment.

The neural network is made up of three layers as shown in FIG. 11 in the present embodiment. The number of elements at an output layer is "1". The output from the network arithmetic operation circuit 41 corresponds to the confidence (abbreviated "CF") of matching as a result of verification. If the confidence CF exceeds a pregiven threshold (net-thresh), "1" as true correspondence or alignment is fed to a robot control device 80. If it is smaller than the threshold, "0" as false correspondence or alignment is outputted to the robot control device 80.

Incidentally, the threshold (net-thresh) is set to 0.5.

It has been known that the neural network can provide coupling factors of a network so as to theoretically obtain a solution of a general nonlinear problem provided that the number of layers in the network exceeds three. The more the number of layers is decreased, the more the learning ability (generalized ability) becomes greater and besides, the quantity of the arithmetic operation is also small. It has been practiced to investigate the learning ability or quantity of the arithmetic operation in the case where the number of layers is three or greater or so in the experiment. As a result, the use of three layers can bring about the best result in term of the learning ability and the quantity of arithmetic operation.

(4) Network Factor Memory

The network factor memory 44 is one for storing each of combination weight factors W at each of layers in the network arithmetic operation circuit 41 for each layer. Each of the combination weight factors W which have been stored in the memory 44 is subjected to reference by the network arithmetic operation circuit 41 and the results are employed in the arithmetic operation referred to above. In addition, reference is also made to each of the combination weight factors W by a network parameter modification circuit 61, so that each of the combination weight factors is modified corresponding to the learning.

6. Learning Device

The learning device 6 is adapted to change each of combination weight factors employed in the network arithmetic operation circuit 41 in accordance with the learning. The learning device 6 is made up of a learning control circuit 60, the network parameter modification circuit 61, an error detection circuit 62 and a learning verification circuit 63.

(1) Learning Control Circuit

The learning control circuit 60 is activated in the following manner. This circuit 60 receives an error $\Delta(=T-CF)$ signal outputted from the error detection circuit 62 so as to cause the image input circuit 10 and the learning verification circuit 63 to be operated when $|\Delta|$ is greater than net-thresh, as expressed in the following inequality:

$$|\Delta| > \text{net-thresh} \tag{20}$$

The threshold net-thresh is a value which is externally given, which is in turn equal to the threshold of an output layer used in the network arithmetic operation circuit 41.

(2) Network Parameter Modification Circuit

The network parameter modification circuit 61 is one for modifying combination weight factors and biases so as to minimize the square error of outputs represented by $$E = \tfrac{1}{2}(T - O^n)^2 \tag{21}$$

where T is a teacher signal and $O\pi$ is an output signal from an output layer.

When a combination weight factor of a j-th element at an i-th layer to an l-th element at an (i+1)-th layer is denoted by $W_j^{i, i+1}$, amount of modification for the combination weight factor is defined by $$\Delta W_{jl}^{i,i+1} = -\mu \cdot \frac{\partial E}{\partial W_{jl}^{i,i+1}} \quad (i \geq 1) \tag{22}$$

And amount of modification for the biases is defined by $$\Delta V_j^i = -\mu \cdot \frac{\partial E}{\partial V_j^i} \tag{23}$$

From the equations (21), (22) and (23), we get the following equations.

$$\Delta W_{jl}^{i,i+1} = \mu \cdot \delta_l^{i+1} \cdot O_j^i \tag{24}$$

$$V_j^i = \mu \cdot \delta_j^i \tag{25}$$

where $$\delta_j^n = (T - O^n) \cdot f'(I_j^n) \tag{26}$$

$$\delta_j^i = f'(I_j^i) \cdot \sum_l \delta_l^{i+1} \cdot W_{jl}^{i,i+1} \tag{27}$$

$$I_j^1 = P_j \quad \text{(input data)} \tag{28}$$

When f(x) is expressed by the equation (19), f'(x) is as follows:

$$f'(x) = f(x)(1 - f(x)) \tag{29}$$

If W and V are brought up to date in succession in accordance with the equations of (21) to (29), it is possible to constitute a neural network which permits minimization of the square error of outputs.

Incidentally, $\mu$ represents a step size for learning, which is in turn externally given. It normally ranges from 0.1 to 0.5.

When the step size $\mu$ is of great, the learning speed becomes faster but an undesired solution may be converged (some of coupling factors or biases become extremely large values, so that a network responsive to noise is formed). It may preferably be in a range from 0.1 to 0.5 empirically. It is however preferable to establish an initial condition such that $\mu$ becomes a smaller value as the number of mesh cells increases. If $\mu$ is successively brought up to date so as to be a larger value as the learning further advances, the high-speed learning can be achieved.

(3) Error Detection Circuit

The error detection circuit 62 is operated as follows. When the output from the network arithmetic operation circuit 41 is taken as CF and the output, i.e., the teacher signal, from the learning verification circuit 63 is set to T, an output error T-CF is delivered from the network arithmetic operation circuit 41 to the learning control circuit 60 and the network parameter modification circuit 61. In practice, such an output error and outputs from the network input-value arithmetic operation circuit 40 are temporarily stored in the memory of the error detection circuit 62, to thereby transmit the stored data to the network parameter modification circuit 61 successively.

(4) Learning Verification Circuit

The learning verification circuit 63 is one for executing the following step.

(a) The learning control circuit 60 causes the image input circuit 10 to become active in a state in which the position/orientation of a real object has been set in a manner similar to that employed in a geometrical model. The matching operation is next executed in the above-described manner and thereafter, the learning verification circuit 63 receives a position/orientation matrix outputted from the position/orientation arithmetic operation circuit 34. If an extracted candidate position/orientation of an object is a unit matrix, i.e., if this position/orientation coincides with that of the geometrical model, a positive teacher signal T represented by "1" is outputted from the learning verification circuit. If they do not coincide with each other, a negative teacher signal T represented by "0" is outputted therefrom. This routine is also performed even in the following step as needed.

(b) The learning control circuit 60 causes the image input circuit 10 to be active in a state in which the position of the object to be recognized has been changed by an external force (human being or the like) without fixing the position of the object. The above-described matching operation is next executed. Thereafter, the learning verification circuit 63 receives a position/orientation matrix outputted from the position/orientation arithmetic circuit 34. It is then performed to inquire of the outside (for example, human being) whether the position/orientation of the object, which is represented by the matrix, is positive or negative. As a consequence, a teacher signal T is outputted from the learning verification circuit corresponding to the positive or negative state.

Figure 12A:
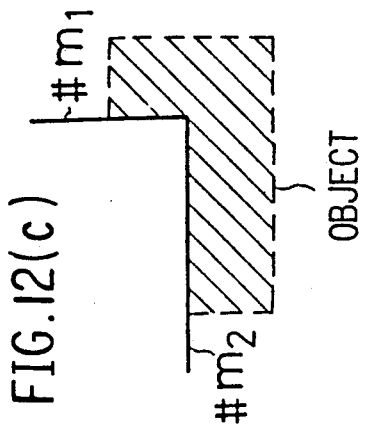
FIG. 12(a) through 12(c) diagrammatically depicts one example of miss-matching of objects or matching of foreign or different objects using search results.
Figure 12B:
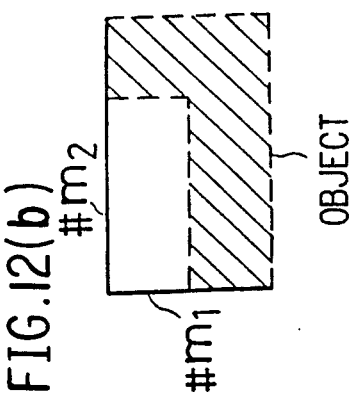
Figure 12C:
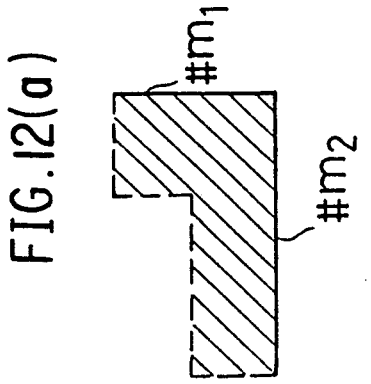
Figure 15B:
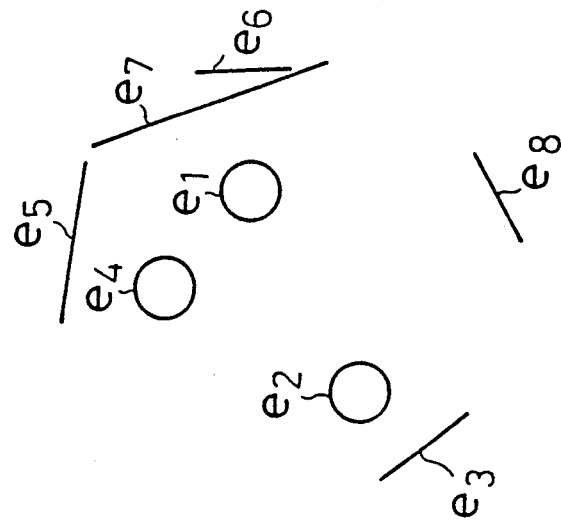
FIGS. 15(a) and 15(b) diagrammatically shows extracted geometrical elements.
Figure 15A:
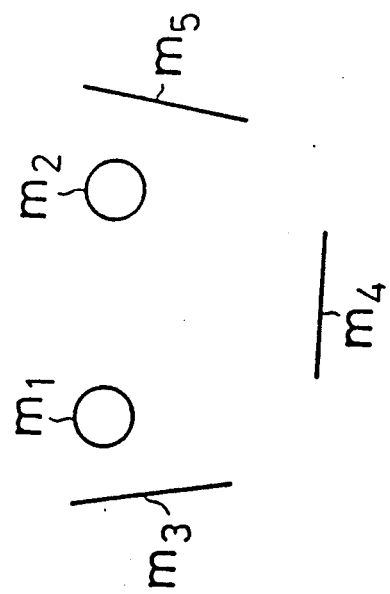

A false correspondence or matching and foreign or different objects obtained as a result of detection and learning according to (a) will be shown in FIG. 12 by way of example.

If the position/orientation matrix outputted from the position/orientation arithmetic operation circuit 34 is unit matrix representation as expressed below, the circuit 34 serves to output a true teacher signal represented by "1". If not, the circuit serves to output a false teacher signal represented by "0".

$$\begin{bmatrix} 1 & 0 & P_x \\ 0 & 1 & P_y \end{bmatrix} \quad (30)$$

The false matching is no longer developed by repeatedly performing learning in the above learning phase (a).

In the learning phase (b), it is judged by the human whether or not the position/orientation of the object is associated with that of the geometrical model. Thus, either of true and false teacher signals is outputted, to thereby permit the learning.

7. Operation of Visual Recognition Apparatus

A description will next be made on the whole operation of the present apparatus.

The present apparatus manages two modes, which consist of a teaching mode for modifying coupling factors of the neural network in accordance with the learning and an execution mode for actually recognizing objects.

(1) Teaching Mode (Modeling Mode)

Step 1: Form Input

Figure 13:
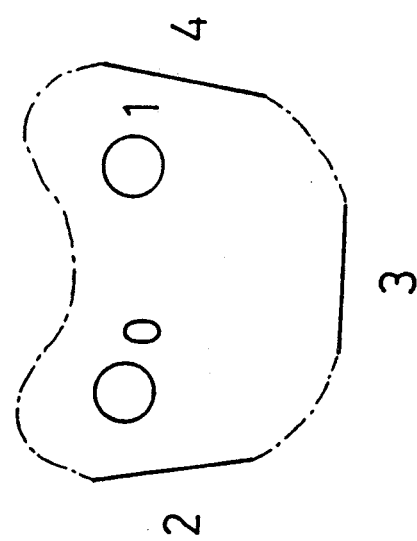
FIG. 13 is a diagrammatic representation of a geometrical model.

The geometrical input circuit 50 produces a geometrical model made up of a circle, a straight line and a corner. In FIG. 13, a geometrical model is produced by two circles (0,1) and three straight lines (2,3,4).

Information about this geometrical model is stored in the circle memory 51, the straight line memory 52 and the corner memory 53. In addition, in the search device 3, this geometrical model is used for matching with each of the geometrical elements which have been stored in the circle memory 23, the straight line memory 24 and the corner memory 25.

In fact, calibration or the like is made in the present step with respect to the basic image extraction device 1, the geometrical feature extraction device 2, the search device 3 or a camera coordinate system.

Step 2: Learning

The network generation circuit 42 initializes a network for verification use, which is employed in the verification device 4.

In this phase, the network is not in a learned state. Next, the learning control circuit 60 serves to bring the combination weight factors of the neural network shown in FIG. 11 up to date while controlling a learning process. In other words, the basic image extraction device 1, the geometrical feature extraction device 2, the search device 3, the verification device 4 and the learning device 6 are driven successively until it is judged that the learning of the network has been terminated in response to outputs from the error detection circuit 62.

The error detection circuit 62 serves to compute the difference between two outputs, i.e., a teacher signal T as an output from the learning verification circuit 63 and an output signal of a non-learning network as an output signal from the verification device 4. Using such a difference, the combination weight factors of the network are brought up to date by the network parameter modification circuit 61.

(2) Execution Mode (Identification Mode)

Step 1: Extraction of Basic Characteristics

The image input circuit 10 photographically records objects by a CCD camera so as to store the resultant gray image in the memory 11. The line-image extraction circuit 12 next receives the gray image therefrom to extract a line image and the extracted line image is then stored in the line image memory 13.

Figure 14:
FIG. 14 is a diagrammatic representation of an extracted line image.

It may be said in general that the line image includes noise and portions incapable of being detected as shown in FIG. 14. Data about line images is used as data to be inputted to the geometrical feature extraction device 2 and the verification device 4.

Step 2: Extraction of Geometrical Features

Circles, straight line and corners are detected by the circle detection circuit 20, the straight line detection circuit 21 and the corner detection circuit 22 respectively. The detected data are stored in the circle memory 23, the straight line memory 24 and the corner memory 25 respectively.

However, no extraction is made on types of shapes which are not included in geometrical models.

Step 3: Search

The correspondence list generation circuit 30 serves to produce a combination of model elements, which have been stored in the memories 51,52,53, with geometrical elements which have been stored in the memories 23,24,25, thereby to store information about the resultant correspondence or combination sets in the correspondence list memory 31.

As such correspondence sets may be mentioned, for example, as follows:

$(m_1, e_2; 0.9), (m_1, e_5; 0.3), (m_1, e_6; 0.5)$
$(m_2, e_2; 0.9), (m_2, e_5; 0.2), (m_2, e_6; 0.3)$
$(m_3, e_1; 0.5), (m_3, e_5; 0.9), \ldots$
$(m_4, e_8; 0.6), \ldots$
$(m_5, e_7; 0.4), \ldots$ where the real number represents the degree of matching consistency of combination. Information about such a correspondence or combination list is stored in the correspondence list memory 31.

It is judged in the correspondence set generation circuit 32 and decision circuit 33 whether or not a relationship in relative position between form elements coincides with that between geometrical models, while generating complex high-order correspondence sets by making use of a primary correspondence set.

As such correspondence sets may be mentioned, for example, as follows:

$(m_1, m_3, m_4, e_2, e_3, e_8; 0.7)$
$(m_1, m_3, m_4, e_6, e_7, e_8; 0.0)$

The real number means the degree of matching consistency of combination. When it exceeds the given threshold, information about a candidate position-/orientation of an object is delivered to the verification device 4 from the decision circuit 33.

Thus, when it exceeds the predetermined second threshold $p_H$, it is practically possible to consider that the search has been terminated in success. In other words, it is judged that each of models has temporarily been associated with or matched with each of objects. The position/orientation of each object to be recognized is given in a form of a mapping matrix relative to each geometrical model.

Step 4: Verification

The network input-value arithmetic operation circuit 40 serves to map a mesh onto a line image by making use of a position/orientation matrix to be inputted from the search device 3 as shown in FIG. 8. Data representing the results of a judgment made as to whether or not a contour line of an image of each object exists within individual cells of the mesh, is applied, as input data, to the network arithmetic operation circuit 41.

The network arithmetic operation circuit 41 applies the data representing the results of a judgment made as to whether or not the above edges exist, to the respective elements corresponding to the respective cells within the input layer shown in FIG. 11 and then executes an arithmetic operation through a neural network shown in FIG. 11, thereby outputting the result. This result represents a verified result. If it is judged that the model and the object is in a true matching state, the network arithmetic operation circuit outputs information about a position/orientation matrix of the object, which is obtained from the search device 3, to the robot control device 80, which in turn recognizes a position-/orientation of the object based on the inputted position/orientation matrix, thereby making it possible to cause a robot to seize the recognized object.

In the present embodiment, as has been described above, the object to be recognized is primarily recognized by matching of the model with the object and besides, information obtained from basic images is processed with the neural network, to thereby evaluate the truth of recognition of the objects. Thus, even in the case where it is hard to extract form elements pertaining to a contour line of an image of each object, it is feasible to eliminate a false correspondence or matching between each geometrical element and each geometrical model by using the neural network, thereby to perform the recognition of each object with high accuracy.

Where it is desired to detect whether or not edges of objects exist within individual cells for a mesh, the combination weight factor pertaining to the output of each operation element corresponding to each cell within which the edges exist is set as "1" for each true object and the coupling factor pertaining to the output of each operation element corresponding to each cell within which the edges exist is set as "−1" for each foreign object. Thus, it is possible to make a distinction between the true objects and foreign objects with high accuracy.

It may also be feasible to judge whether or not flaws in objects exist, by inputting, as input values, mean values of lightness on pixels within cells for a mesh to the neural network. In other words, it is feasible to determine whether or not the flaws exist because the quantity of light reflected within the objects to be recognized is not constant.

Even in the case where it is desired to recognize only an object disposed at the top, out of objects which are overlapped above and below, recognition can be made with high accuracy. Even in the case where an object disposed below is referenced or matched with a model, values representing data pertaining to the object disposed below, which are inputted to the neural network, become values representing data pertaining to an object provided above in overlapped regions. It is therefore possible to eliminate each object disposed below from objects to be recognized according to outputs from the verification device.

In addition, the learning device is used in a recognition mode for recognizing objects to be recognized in practice. Where false recognition is developed, the learning device can also teach its false. Thus, the efficiency in learning can be improved.

Where the present apparatus is driven in a state in which the position/orientation of each object to be recognized is aligned to that of the model and then it automatically produces each true teacher signal represented by "1" where the position/orientation matrix outputted from the position/orientation arithmetic operation circuit 34 is unit matrix representation, and each false teacher signal represented by "0" where it is not unit matrix representation, the learning is automatically carried out, to thereby make it possible to reduce the burden imposed on an operator, which is for performing learning.

In the present invention, as has been described above, one candidate of objects to be recognized is selected by extracting geometrical elements of an object to compare the extracted elements with geometrical elements of a model and then searching sets of geometrical element which are capable of assuredly being matched or verified from the comparison results. The model is thereafter mapped on a basic image of each object, corresponding to the obtained information. On the basis of the resultant information, the neural network serves to evaluate the truth of correspondence or matching of the object to the model.

Thus, even if noise exerts influence on the extraction of geometrical elements or false correspondence or alignment to the geometrical model is developed, it is possible to truly decide one of objects corresponding to the model, so that the accuracy in recognition of the objects can be improved.

The combination weight factors employed in the neural network are determined by learning effects which are brought about by a learning means. It is therefore feasible to enhance the accuracy in recognition of the objects by causing the means to learn examples in which false recognition has been done. In addition, the conventional verification algorithm or the like becomes unnecessary, so that the burden imposed on the operator can be reduced.

Furthermore, where each teacher signal is produced based on the degree of consistency of information about a candidate position/orientation outputted from the search means with information about a known position/orientation of a model, i.e., a true or false value of information about the candidate position/orientation, in a state in which a position/orientation of a real object to be recognized has accurately been matched with a known position/orientation of a model, an effect of improvement in efficiency in learning because of automatic generation of teacher signals may be brought about

Having now fully described the invention it will be apparent to those skilled in the art that many changes and modifications can be made without departing from the spirit or scope of the invention as set forth herein.

What is claimed is:

1. A visual recognition apparatus, comprising:
basic image extraction means for extracting a basic image of objects from each pixel in a two-dimensional gray image of said objects;
line image extraction means for extracting a line image obtained through a spatial differentiation of said extracted basic image;
geometrical feature extraction means for extracting geometrical elements representing geometry of said objects from said extracted line image;
search means for searching said extracted geometrical elements which match a geometrical model composed of model elements representing an object to be recognized, and for getting a candidate position/orientation of said object to be recognized, based on a relative position of said geometrical elements and said model elements; and
verification means for verifying whether or not said candidate position/orientation of object to be recognized obtained by said search means accurately matches said object to be recognized;
the verification means including;
network input-value arithmetic operation means for mapping mesh cells obtained by dividing a region fixed to said geometrical model into some small regions on said basic image or said line image based on said candidate position/orientation, matching positions/orientations of said object to be recognized and the geometrical model to each other and determining a value representing each of said mesh cells in reference to a basic image or a line image in each of said mesh cells; and
a neutral network having input elements, each of said input elements one to one corresponding to each cell in said mesh cells and inputting an output-value of each cell obtained by said network input-value arithmetic operation means, having an output element for outputting a true or false value, and calculating an output-value of said output element from input-values to said input elements.

2. A visual recognition apparatus, comprising:
basic image extraction means for extracting a basic image of objects from each pixel in a two-dimensional gray image of said objects;
line image extraction means for extracting a line image obtained through a spatial differentiation of said extracting basic image;
geometrical feature extraction means for extracting geometrical elements representing geometry of said objects from said extracted line image;
search means for searching said extracted geometrical elements which match a geometrical model composed of model elements representing an object to be recognized, and for getting a candidate position/orientation of said object to be recognized, based on a relative position of said geometrical elements and said model elements;
verification means for verifying whether or not said candidate position/orientation of object to be recognized obtained by said search means accurately matches said object to be recognized;
the verification means including;
network input-value arithmetic operation means for mapping mesh cells obtained by dividing a region fixed to said geometrical model into some small regions on said basic image or said line image based on said candidate position/orientation, for matching position/orientations of said object to be recognized and the geometrical model to each other and determining a value representing each of said mesh cells in reference to a basic image or a line image in each of said mesh cells; and a neural network having input elements, each of said input elements, one to one corresponding to each cell in said mesh cells and inputting an output-value of each cell obtained by said network input-value arithmetic operation means, having an output element for outputting a true of false value, and calculating an output-value of said output element from input-values to said input elements; and learning means for making an output of each cell of said mesh cells as an Input signal, modifying combination weight factors of said neural network based on said input signal, a verified result of said verification means corresponding to said input signal and a teacher signal for providing an evaluation value representing truth of said verified result and outputting modified combination weight factors to said verification means.

3. A visual recognition apparatus, comprising:

basic image extraction means for extracting a basic image of objects from each pixel in a two-dimensional gray image of said objects;

line image extraction means for extracting a line image obtained through a spatial differentiation of said extracted basic image;

geometrical modeling means for producing a geometrical model composed of model elements constituted of lines specifying geometry of a model representing an object to be recognized;

geometrical feature extraction means for extracting geometrical elements representing geometry of said objects from said extracted line image;

search means for searching said extracted geometrical elements which match a geometrical model composed of model elements representing an object to be recognized, and for getting a candidate position/orientation of said object to be recognized, based on a relative position of said geometrical elements and said model elements;

verification means for verifying whether or not said candidate position/orientation of object to be recognized obtained by said search means accurately matches said object to be recognized;

the verification means including;

network input-value arithmetic operation means for mapping mesh cells obtained by dividing a region fixed to said geometrical model into some small regions on said basic image or said line image based on said candidate position/orientation, matching positions/orientations of said object to be recognized and the geometrical model to each other and determining a value representing each of said mesh cells in reference to a basic image or a line image in each of said mesh calls; and a neural network having input elements, each of said input elements one to one corresponding to each cell in said mesh cells and inputting an output-value of each cell obtained by said network input-value arithmetic operation means, having an output element for outputting a true or false value, and calculating an output-value of said output element from input-values to said input elements; and learning means for making an output of each cell of said mesh cells as an input signal, modifying combination weight factors of said neural network based on said input signal, a verified result of said verification means corresponding to said input signal and a teacher signal for providing an evaluation value representing truth of said verified result and outputting modified combination weight factors to said verification means, 4. The apparatus as claimed in claim 1, wherein said geometrical elements are selected from straight lines, corners, circles and combinations thereof; and said model elements are selected from straight lines, corners, curves, circles, and combinations thereof representing a main portion of each contour line of the model.

5. The apparatus as claimed in claim 3, wherein:

said learning means is adapted to perform a modification arithmetic operation for each of the combination weight factors in said neural network in accordance with said input signal given by said each cell of said mesh cells and the difference between a true or false value corresponding to said input signal with respect to, said candidate position/orientation and each of values corresponding to said input signal outputted from said neural network and to execute said modification arithmetic operation of said factors until said difference becomes zero.

6. The apparatus as claimed in claim 1, wherein;

said network input-value arithmetic operation means decides said output-value of said each cell of said mesh cells based upon whether or not the contour line of said basic image exists in said each cell.

7. The apparatus as claimed in claim 6, wherein said network input-value arithmetic operation means decides said output-value of said each cell of said mesh cells based upon whether or not the contour line of said basic image exists in line pixels, each of said line pixels intersecting in a cross form at a center of each cell of said mesh cells.

8. A visual recognition apparatus, comprising:

basic image extraction means for extracting a basic image of objects from each pixel in a two-dimensional gray image of said objects;

geometrical feature extraction means for extracting geometrical elements representing geometry of said objects from said extracted basic image;

search means for searching said extracted geometrical elements which match a geometrical model composed of model elements representing an object to be recognized, and for getting a candidate position/orientation of said object to be recognized, based on a relative position of said geometrical elements and said model elements; and verification means for verifying whether or not said candidate position/orientation of object to be recognized obtained by said search means accurately matches said object to be recognized;

the verification means including;

network input-value arithmetic operation means for mapping mesh cells obtained by dividing a region fixed to said geometrical model into some small regions on said basic image based on said candidate position/orientation, matching positions/orientations of said object to be recognized and the geometrical model to each other and determining a value representing each of said mesh cells in reference to a basic image in each of the said mesh cells; and a neural network having input elements, each of said input elements one to one corresponding to each cell in said mesh cells and inputting an output-value of each cell obtained by said network input-value arithmetic operation means, having an output element for outputting a true or false value, and calculation an output-value of said output element from input-values to said input elements.

* * * * *